US011757741B2

(12) United States Patent
Ishizuka et al.

(10) Patent No.: US 11,757,741 B2
(45) Date of Patent: Sep. 12, 2023

(54) DEMAND PREDICTION APPARATUS, DEMAND PREDICTION METHOD AND PROGRAM FOR PREDICTING A DEMAND OF A PATH ON A NETWORK USING SELECTED TREND PATTERNS

(71) Applicant: Nippon Telegraph and Telephone Corporation, Tokyo (JP)

(72) Inventors: Mika Ishizuka, Musashino (JP); Yasuharu Kaneko, Musashino (JP); Seisho Yasukawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 128 days.

(21) Appl. No.: 17/433,049

(22) PCT Filed: Feb. 13, 2020

(86) PCT No.: PCT/JP2020/005623
§ 371 (c)(1),
(2) Date: Aug. 23, 2021

(87) PCT Pub. No.: WO2020/175162
PCT Pub. Date: Sep. 3, 2020

(65) Prior Publication Data
US 2022/0353161 A1 Nov. 3, 2022

(30) Foreign Application Priority Data

Feb. 25, 2019 (JP) .................................. 2019-031254

(51) Int. Cl.
*G06F 15/173* (2006.01)
*H04L 43/062* (2022.01)
(Continued)

(52) U.S. Cl.
CPC ............ *H04L 43/062* (2013.01); *H04L 41/12* (2013.01); *H04L 43/04* (2013.01)

(58) Field of Classification Search
CPC .............................. H04L 41/12; H04L 43/062
(Continued)

(56) References Cited

U.S. PATENT DOCUMENTS 7,725,575 B2 * 5/2010 Matsumoto ......... H04L 41/0894
709/203
8,676,964 B2 * 3/2014 Gopalan ............... H04L 41/147
709/224

(Continued)

OTHER PUBLICATIONS

Sugomori, "Detailed Explanation Deep Learning Time-Series Data Processing by TensorFlow/Keras," dated May 21, 2018, 5.2:227-245, 21 pages (with English translation).

(Continued)

Primary Examiner — Hee Soo Kim
(74) Attorney, Agent, or Firm — Fish & Richardson P.C.

(57) ABSTRACT

A demand prediction apparatus allows for a prediction with a variation in terms of demand by acquiring, out of changes in demand in a first time period, changes in the demand in a second time period which is a part of the first time period acquiring changes in the demand in third time periods, which is a plurality of time periods excluding the second time period within the first time period, for each of the third time periods having different lengths, identifying, for combinations of a plurality of trend patterns and the third time periods, parameters of the corresponding plurality of trend patterns such that a value of a trend pattern of the plurality of trend patterns is equal to the demand at a certain time point in the first time period, evaluating suitability with the changes in the demand in the second time period for each of the plurality of trend patterns for each of the combinations in which a parameter of the parameters is identified, and (Continued)

selecting one or more trend patterns from among the plurality of trend patterns for each of the combinations based on evaluation results.

9 Claims, 16 Drawing Sheets

(51) Int. Cl.
*H04L 41/12* (2022.01)
*H04L 43/04* (2022.01)

(58) Field of Classification Search
USPC .......................................................... 709/224
See application file for complete search history.

(56) References Cited

U.S. PATENT DOCUMENTS

| | | | |
|---|---|---|---|
| 2007/0130357 A1* | 6/2007 | Matsumoto | G06Q 10/06315 709/231 |
| 2014/0304390 A1* | 10/2014 | Bates | H04L 12/6418 709/224 |
| 2020/0228431 A1* | 7/2020 | Samadi | H04L 41/0896 |

OTHER PUBLICATIONS wikipedia.com, "Regression Analysis," dated Oct. 22, 2018, retrieved on retrieved from URL <https://ja.wikipedia.org/wiki/%E5%9B%9E%E5%B8%B0%E5%88%86%E6%9E%90>, 7 pages (with English translation).

* cited by examiner

| START POINT | END POINT | OPEN DATE | ABOLITION DATE | ATTRIBUTE | | |
|---|---|---|---|---|---|---|
| | | | | SYSTEM NAME | BAND | IF TYPE |
| A | B | 2005/10 | 2010/01 | WDM | 1G | 1G-Ether |
| A | C | 2005/07 | | OXC | 10G | 10G-Ether |
| A | B | 2005/11 | | OXC | 100G | 100G |
| A | C | 2005/12 | 2006/02 | WDM | 10G | 10G-Ether |
| ⋮ | ⋮ | ⋮ | ⋮ | ⋮ | ⋮ | ⋮ |

Fig. 3

DESTINATION #1: BETWEEN A AND B

| DATE | ATTRIBUTE 1 | | ATTRIBUTE 2 | | T1 |
|---|---|---|---|---|---|
| | NEW SETUP | ABOLITION | NEW SETUP | ABOLITION | |
| 2005/10 | 10 | 0 | 10 | 0 | |
| 2005/11 | 30 | 5 | 30 | 5 | |
| ⋮ | ⋮ | ⋮ | ⋮ | ⋮ | |

DESTINATION #2: BETWEEN A AND C

| DATE | ATTRIBUTE 1 | | ATTRIBUTE 2 | | T2 |
|---|---|---|---|---|---|
| | NEW SETUP | ABOLITION | NEW SETUP | ABOLITION | |
| 2005/10 | 100 | 0 | 20 | 1 | |
| 2005/11 | 120 | 0 | 30 | 1 | |
| ⋮ | ⋮ | ⋮ | ⋮ | ⋮ | |

| TIME | ACTUAL DEMAND | PREDICTION | e(x) | E[e](x) | E[σ](x) | UPPER LIMIT OF ERROR | EXCEEDING THRESHOLD VALUE |
|---|---|---|---|---|---|---|---|
| 1 | 10 | 10 | 0 | 0 | 0 | 0 | FALSE |
| 2 | 20.94633 | 20 | 0.946333 | 0.946333 | 0.946333029 | 2.838999 | FALSE |
| 3 | 30.99262 | 30 | 0.992621 | 0.957905 | 0.718428689 | 2.394762 | FALSE |
| 4 | 41.79201 | 40 | 1.792015 | 1.166432 | 0.695217119 | 2.556867 | FALSE |
| 5 | 52.40755 | 50 | 2.407554 | 1.476713 | 0.754123138 | 2.984959 | FALSE |
| 6 | 82.91692 | 60 | 22.91692 | 6.836765 | 4.585631205 | 16.00803 | TRUE |
| 7 | 93.04873 | 70 | 23.04873 | 10.88976 | 6.478967825 | 23.84769 | FALSE |
| 8 | 103.3012 | 80 | 23.30122 | 13.99262 | 7.186375679 | 28.36537 | FALSE |
| 9 | 113.6879 | 90 | 23.68795 | 16.41645 | 7.207655157 | 30.83177 | FALSE |
| 10 | 123.8476 | 100 | 23.84759 | 18.27424 | 6.799080016 | 31.8724 | FALSE |
| 11 | 134.845 | 110 | 24.845 | 19.91693 | 6.331328305 | 32.57959 | FALSE |
| 12 | 145.1034 | 120 | 25.10339 | 21.21355 | 5.72095779 | 32.65546 | FALSE |
| 13 | 155.8358 | 130 | 25.83579 | 22.36911 | 5.157388715 | 32.68388 | FALSE |
| 14 | 166.7806 | 140 | 26.78055 | 23.47197 | 4.695187849 | 32.86234 | FALSE |

| TIME | ACTUAL DEMAND | PREDICTION | e(x) | E[e](x) | E[σ](x) | UPPER LIMIT OF ERROR | EXCEEDING THRESHOLD VALUE |
|---|---|---|---|---|---|---|---|
| 1 | 10 | 10 | 0 | 0 | 0 | 0 | FALSE |
| 2 | 20.7637 | 20 | 0.763701 | 0.763701 | 0.763701 | 2.291102 | FALSE |
| 3 | 30.82426 | 30 | 0.824256 | 0.778839 | 0.58413 | 1.947099 | FALSE |
| 4 | 41.60949 | 40 | 1.609487 | 0.986501 | 0.593844 | 2.174189 | FALSE |
| 5 | 52.15631 | 50 | 2.156312 | 1.278954 | 0.664722 | 2.608399 | FALSE |
| 6 | 82.5011 | 60 | 22.5011 | 6.58449 | 4.477694 | 15.53988 | TRUE |
| 7 | 112.6588 | 70 | 42.65883 | 15.60308 | 10.12221 | 35.8475 | TRUE |
| 8 | 142.872 | 80 | 62.87198 | 27.4203 | 16.45458 | 60.32946 | TRUE |
| 9 | 173.4201 | 90 | 83.42007 | 41.42025 | 22.84089 | 87.10203 | FALSE |
| 10 | 203.4435 | 100 | 103.4435 | 56.92606 | 28.76003 | 114.4461 | FALSE |
| 11 | 234.0773 | 110 | 124.0773 | 73.71388 | 34.16088 | 142.0356 | FALSE |
| 12 | 264.4027 | 120 | 144.4027 | 91.38607 | 38.87481 | 169.1357 | FALSE |
| 13 | 294.729 | 130 | 164.729 | 109.7218 | 42.9079 | 195.5376 | FALSE |
| 14 | 325.607 | 140 | 185.607 | 128.6931 | 46.40941 | 221.5119 | FALSE |

DEMAND PREDICTION APPARATUS, DEMAND PREDICTION METHOD AND PROGRAM FOR PREDICTING A DEMAND OF A PATH ON A NETWORK USING SELECTED TREND PATTERNS

CROSS-REFERENCE TO RELATED APPLICATIONS

This application is a National Stage application under 35 U.S.C. § 371 of International Application No. PCT/JP2020/005623, having an International Filing Date of Feb. 13, 2020, which claims priority to Japanese Application Serial No. 2019-031254, filed on Feb. 25, 2019. The disclosure of the prior application is considered part of the disclosure of this application, and is incorporated in its entirety into this application.

TECHNICAL FIELD

The present invention relates to a demand prediction apparatus, a demand prediction method, and a program.

BACKGROUND ART

In demand prediction of a path on a network or the like, depending on the application of the prediction, there are cases in which downside trend is required (such as a case for use in a study of network topology) and cases in which upside trend is required (such as a case for use in inventory management of infrastructure facilities of the network), rather than a prediction line of a trend having the highest degree of suitability. Note that the term "path" refers to a network usage request in which a start node, an end node, and a required band or interface type, and the like are specified.

CITATION LIST

Non Patent Literature

NPL 1: "Regression Analysis", [online], Internet <https://ja.wikipedia.org/wiki/%E5%9B%9E%E5%B8%B0%E5%88%86%E6%9E%90>
NPL 2: Sugomori, "Detailed Explanation of Deep Learning: Time Series Data Processing by TensorFlow, Keras", Mynavi Publishing Corporation (2017)

SUMMARY OF THE INVENTION

Technical Problem

However, in combinations of conventional techniques, it is difficult to perform demand prediction in light of the above-described circumstances. For example, NPLs 1 and 2 do not support predictions with a variation (optimal, upside, downside, or the like) in terms of demand.

The present invention has been made in view of the above and it is an object of the present invention to enable a prediction with a variation in terms of demand.

Means for Solving the Problem

In order to solve the above-described problem, a demand prediction apparatus includes a first acquisition unit configured to acquire, out of changes in demand in a first time period, changes in the demand in a second time period which is a part of the first time period a second acquisition unit configured to acquire changes in the demand in third time periods, which is a plurality of time periods excluding the second time period within the first time period, for each of the third time periods having different lengths, a first identification unit configured to identify, for combinations of a plurality of trend patterns and the third time periods, parameters of the corresponding plurality of trend patterns such that a value of a trend pattern of the plurality of trend patterns is equal to the demand at a certain time point in the first time period, and a selection unit configured to evaluate suitability with the changes in the demand in the second time period for each of the plurality of trend patterns for each of the combinations in which a parameter of the parameters is identified and select one or more trend patterns from among the plurality of trend patterns for each of the combinations based on evaluation results.

Effects of the Invention

A prediction with a variation in terms of demand can be made possible.

BRIEF DESCRIPTION OF DRAWINGS

FIG. 3 is a diagram illustrating an example of a configuration of design history data.

FIG. 4 is a diagram illustrating an example of a configuration of a demand storage unit 13.

DESCRIPTION OF EMBODIMENTS

Figure 1:
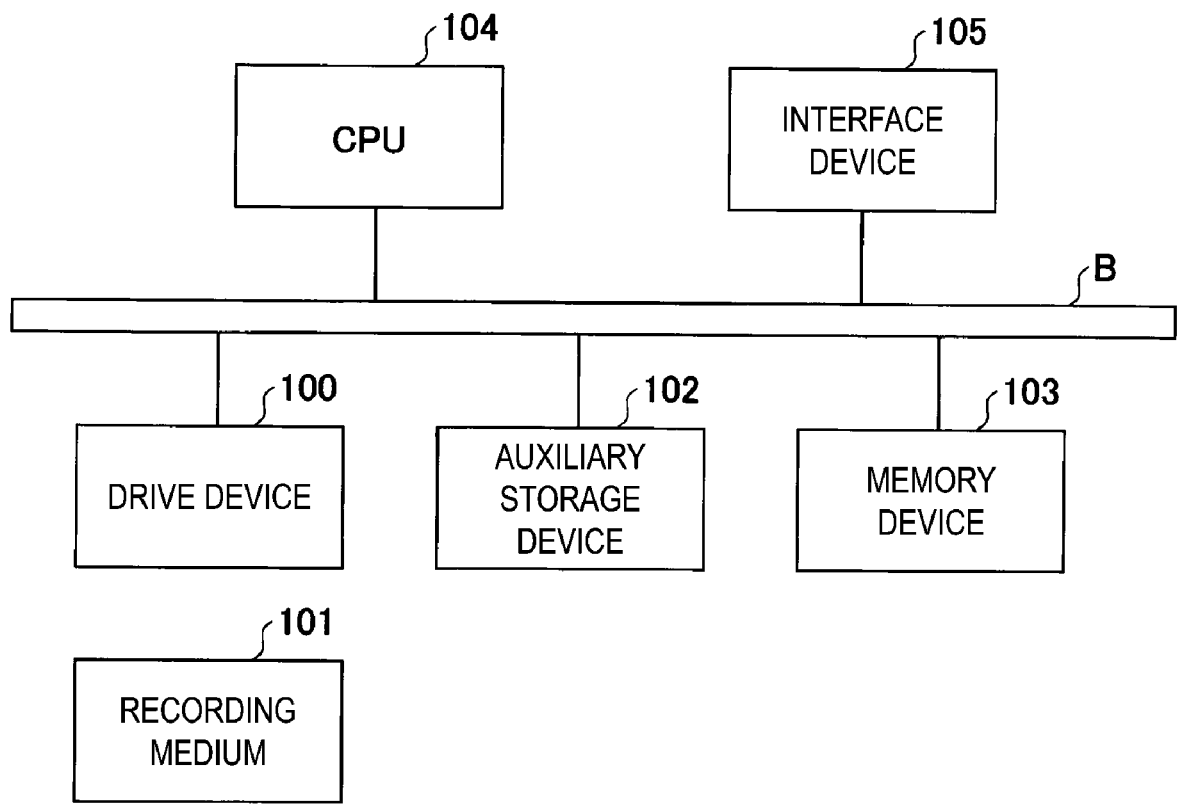
FIG. 1 is a diagram illustrating an exemplary hardware configuration of a demand prediction apparatus 10 according to an embodiment of the present invention.

Hereinafter, an embodiment of the present invention will be described with reference to the drawings. FIG. 1 is a diagram illustrating an exemplary hardware configuration of a demand prediction apparatus 10 according to an embodiment of the present invention. The demand prediction apparatus 10 in FIG. 1 is a computer that includes a drive device 100, an auxiliary storage device 102, a memory device 103, a CPU 104, an interface device 105, and the like which are connected to each other by a bus B.

A program that implements processing of the demand prediction apparatus 10 is provided through a recording medium 101 such as a CD-ROM. When the recording medium 101 storing the program is set in the drive device 100, the program is installed on the auxiliary storage device 102 from the recording medium 101 through the drive device 100. However, the installation of the program does not necessarily need to be performed from the recording medium 101, and the program may be downloaded from another computer through a network. The auxiliary storage device 102 stores the installed program and also stores necessary files, data, and the like.

The memory device 103 reads the program from the auxiliary storage device 102 and stores the program in a case where an instruction for starting the program is given. The CPU 104 executes a function relating to the demand prediction apparatus 10 according to a program stored in the memory device 103. The interface device 105 is used as an interface for connection to a network.

Figure 2:
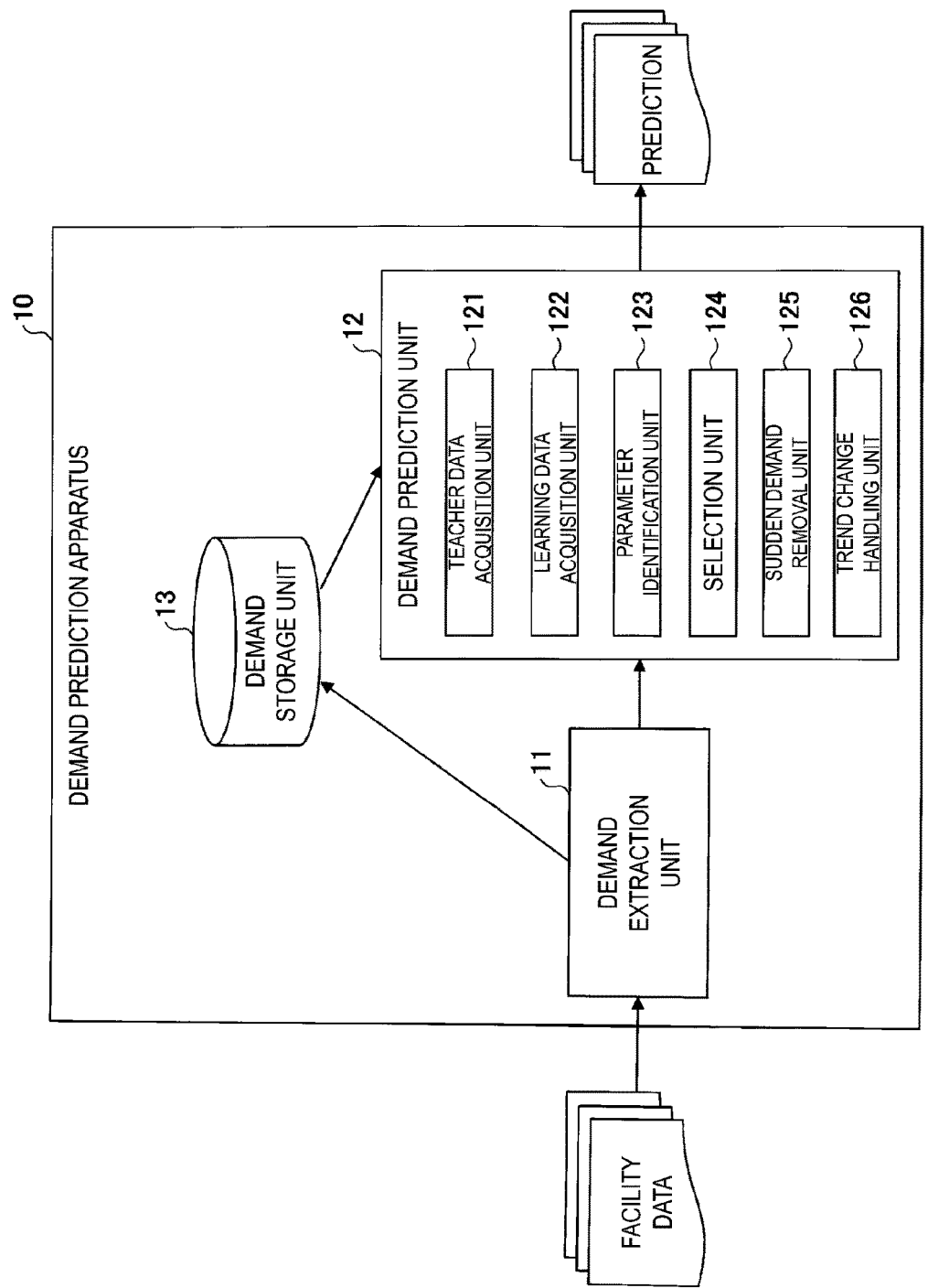
FIG. 2 is a diagram illustrating an exemplary functional configuration of the demand prediction apparatus 10 according to the embodiment of the present invention.

FIG. 2 is a diagram illustrating an exemplary functional configuration of the demand prediction apparatus 10 according to the embodiment of the present invention. In FIG. 2, the demand prediction apparatus 10 includes a demand extraction unit 11 and a demand prediction unit 12. Each of these units is implemented by processing that one or more programs installed in the demand prediction apparatus 10 cause the CPU 104 to execute. The demand prediction apparatus 10 also uses a demand storage unit 13. The demand storage unit 13 can be implemented by using, for example, the auxiliary storage device 102, or a storage device connectable to the demand prediction apparatus 10 via a network or the like.

The demand extraction unit 11 accepts an input of design history data regarding to a path. The term "path" refers to a network usage request in which a start node, an end node, and a required band or interface type, and the like are specified.

FIG. 3 is a diagram illustrating an example of a configuration of the design history data. As illustrated in FIG. 3, the design history data includes, for example, start point, end point, open date, abolition date, attributes, and the like, for each pass that is requested to be opened. The start point is an identifier of a node that is the start point of the path on the network. The end point is an identifier of a node that is the end point of the path. The open date is the date (or date and time) that the pass was opened. The abolition date is the date (or date and time) that the pass was abolished. The attributes are attributes relating to the path. In FIG. 3, system names, bands, and IF (interface) types are illustrated as examples of items that constitute the attributes. The system name is the name of the system that contains the path. The IF type is the type of interface that the pass utilizes. The band is the band requested for the path.

The demand extraction unit 11 aggregates a group of design history data for each destination (set of start point and end point) and for each combination of attributes, and stores the aggregation results in the demand storage unit 13.

FIG. 4 is a diagram illustrating an example of a configuration of the demand storage unit 13. In FIG. 4, an example is illustrated in which the accumulating totals of the demand in a unit of month for each design type (new and abolished) are aggregated for each ground and each attribute.

Specifically, a table T1 illustrates the aggregation results for each month of the accumulating totals of the demand for new setups and the aggregation results for each month of the accumulating totals of the demand for abolition, according to combinations of two kinds of attributes, attribute 1 and attribute 2, for the set of design history data with the start point being A, and the end point being B. Similarly, a table T2 illustrates the aggregation results for the accumulating totals of the demand for new setup and the aggregation results for the accumulating totals of the demand for abolition, according to combinations of two kinds of attributes, attribute 1 and attribute 2, for the set of design history data with the start point being A, and the end point being C.

Here, attribute 1 and attribute 2 are units that are distinguished by system name, IF type, or combination of system name and IF type. The new setup corresponds to the open date and the abolition corresponds to the date of the abolition.

Thus, for example, the column of the new setup of attribute 1 of the first record in the table T1 indicates the aggregation result of the demand based on a set of design history data in which the value of the attribute corresponds to attribute 1, and the open month is 2005/10 or earlier, among the sets of design history data with the start point being A and the end point being B. Here, the value of the aggregation results of the demand may be the number of the relevant design history data or may be the sum of the bands of the relevant design history data. For example, the column of the abolition of attribute 1 of the first record in the table T1 indicates the aggregation result of the demand based on a set of design history data in which the value of the attribute corresponds to attribute 1, and the abolition month is 2005/10 or earlier, among the sets of design history data with the start point being A and the end point being B.

The demand prediction unit 12 uses the data stored in the demand storage unit 13 to predict the trend of demand for the paths for each column of each table in FIG. 4 (i.e., for each destination and for each new setup or abolition according to attribute (hereinafter referred to as a "prediction unit")). In FIG. 2, the demand prediction unit 12 includes a teacher data acquisition unit 121, a learning data acquisition unit 122, a parameter identification unit 123, a selection unit 124, a sudden demand removal unit 125, a trend change handling unit 126, and the like.

Figure 5:
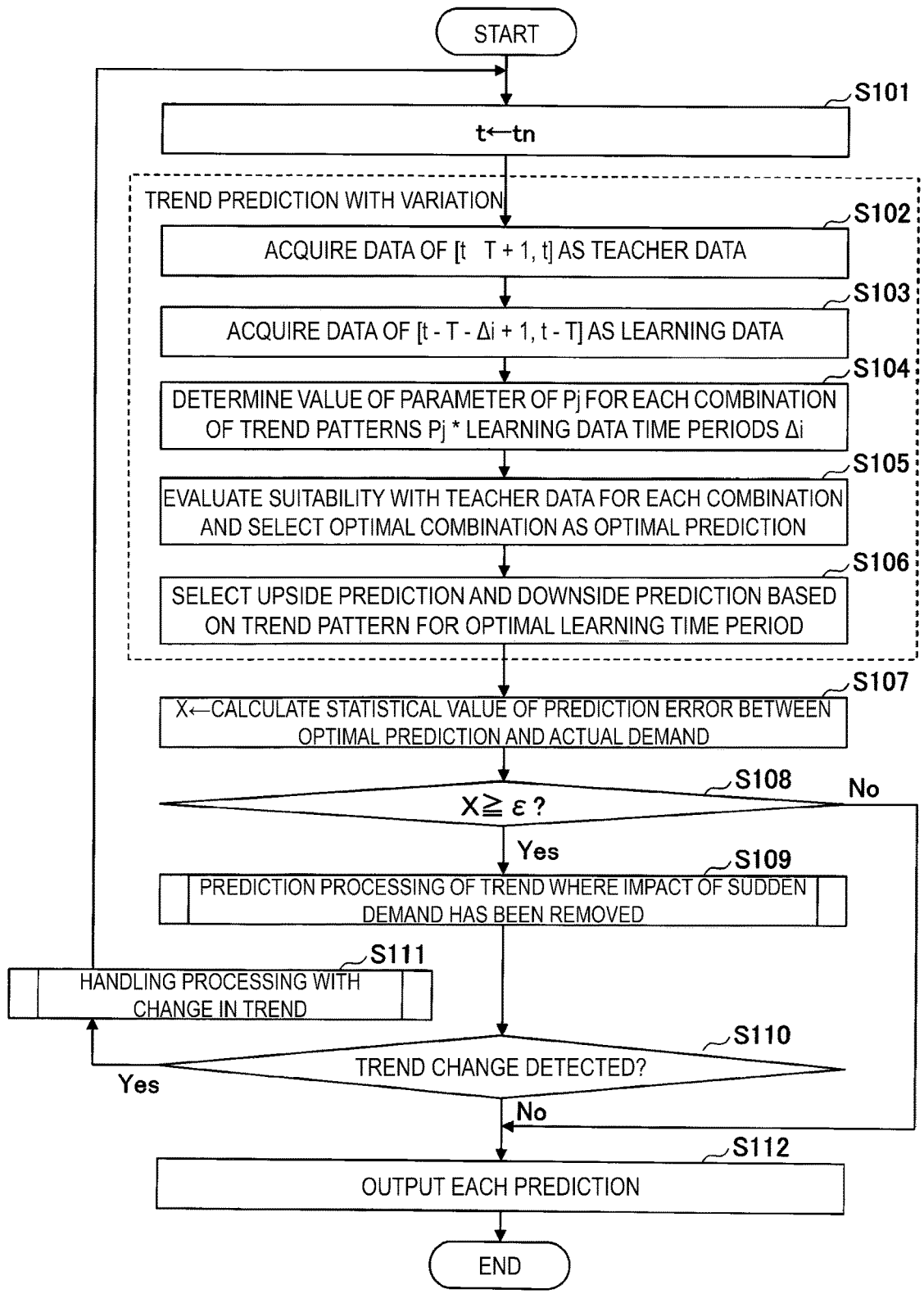
FIG. 5 is a flowchart for explaining an example of a processing procedure of a prediction processing of a trend of demand for paths.

Hereinafter, a processing procedure executed by the demand prediction unit 12 will be described. FIG. 5 is a flowchart for explaining an example of a processing procedure of a prediction processing of the trend of the demand for the paths. The processing procedure of FIG. 5 is performed for each prediction unit. Hereinafter, a prediction unit to be processed is referred to as a "target prediction unit". Note that in the present embodiment, it is assumed that the target prediction unit is data relating to a new setup of certain attributes between certain destinations.

In step S101, the demand prediction unit 12 substitutes a final demand occurrence time tn of the target prediction unit into a prediction original final time t (initializes the prediction original final time t by the final demand occurrence time tn).

Figure 6:
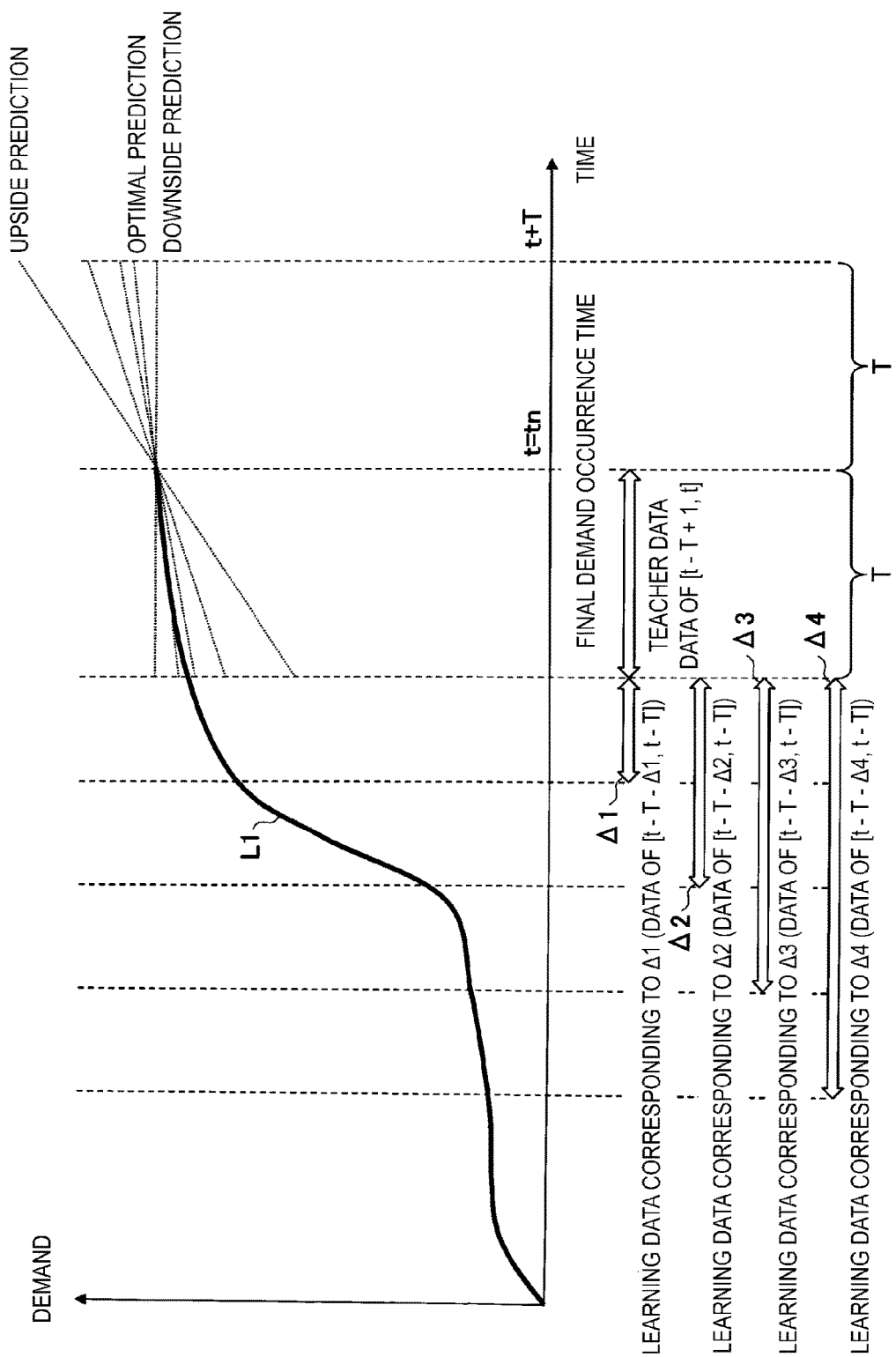
FIG. 6 is a diagram for explaining a prediction of a trend of demand for a target prediction unit.

FIG. 6 is a diagram for explaining the prediction of the trend of demand for the target prediction unit. In the graph of FIG. 6, the horizontal axis is the time and the vertical axis is the demand. Thus, a curve L1 indicates the time series data of the target prediction unit (aggregation result of the accumulating totals of the demand per month). Here, the final demand occurrence time tn is the time corresponding to the end point of the curve L1, in other words, the open month of the last design history data for the target prediction unit (according to the aggregation time period of demand). Note that the prediction original final time t indicates the final time of the time series data of the target prediction unit utilized in the prediction of the trend of the demand. Here, an example in which the prediction original final time t is initialized by the final demand occurrence time tn has been illustrated, but the prediction original final time t may be initialized by a time point before tn.

Note that, in the present embodiment, of the time series data of the target prediction unit, time series data from a time period after the time when demand becomes greater than zero for the first time (hereinafter referred to as the "prediction original time period") is used as the source data for the prediction. Thus, the time series data for the prediction original time period is illustrated as the curve L1 in FIG. 6.

Subsequently, the teacher data acquisition unit 121 acquires time series data (change in demand) of [t−T+1, t] (teacher data time period) which is a part of the prediction original time period, as a teacher data (S102). Here, T is a parameter preset by a user and indicates the length of the time period to be predicted (for example, 2 years, or the like). "+1" in [t−T+1, t] is one month in the present embodiment. This is based on that the demand has been aggregated in the unit of one month in the present embodiment as illustrated in FIG. 3. In other words, the unit of "+1" follow the aggregation time period of the demand. Note that the teacher data time period is not limited to [t−T+1, t]. For example, data of [t−α−T+1, t−α] offset by a minutes earlier may be acquired as teacher data. In other words, the end point of the teacher data time period may not coincide with t.

Subsequently, the learning data acquisition unit 122 acquires, as learning data, time series data (change in demand) for a plurality of time periods of [t−T−Δi+1, t−T] in a time period other than the teacher data time period of the prediction original time period (S103). Here, Δi (i=1, . . . , I) is a parameter preset by a user, and each Δi is different in length (time period) from one another. In FIG. 6, an example of I=4 is illustrated. Thus, in this case, four pieces of learning data are acquired. The maximum value of length of Δi (length of Δ4 in FIG. 6) may be determined based on system information of the network system in which the path is located, for example, the period when the network system before one generation began the service, or the like (for example, six years, or the like). The minimum value of Δi (length of Δ1 in FIG. 6) is determined by the user based on the length (T) of the time period to be predicted (for example, the same length as T).

Note that in a case where the number of data for the prediction original time period (the number of months of the prediction original time period) is less than the minimum value of T+Δi (in a case where the time point in which the demand becomes greater than 0 for the first time is less than the minimum value of t−T−Δi+1), the values of T and Δi may be set to further smaller value (for example, flat 1/n).

Subsequently, the parameter identification unit 123 determines the parameters of each Pj by an optimization technique for each combination of a plurality of trend patterns (Pj)*the learning data time periods (Δi) that are prepared by the user in advance (S104). Here, a trend pattern (Pj) is, for example, a linear function, a sigmoid function, a soft plus function, a soft sine function, and an exponential function. In this case, j is j=1, . . . , 5. In other words, P1=linear function, P2=sigmoid function, P3=soft plus function, P4=soft sign function, and P5=exponential function. Thus, in a case of I=4, the number of combinations of the trend patterns (Pj)*learning data time periods (Δi) is 5*4=20. Note that these functions are described in detail in, for example, "https://ja.wikiipedia.org/wiki/ %E6%B4%BB%E6%80%A7%E5%8C%96% E9%96% A2%E6%95%B0".

In step S104, the parameter identification unit 123 determines a value of a parameter for each trend pattern (Pj) by adjusting the value so that a predicted value corresponding to the prediction original final time t (a value based on the trend pattern) is equal to the demand d(t) corresponding to the prediction original final time t, for each combination of the trend patterns (Pj)*the learning data time periods (Δi). However, in a case where it is within the prediction original time period, the value of the parameter may be adjusted so that the predicted value at the timing t' other than the prediction original final time t and the demand d (t') are equal.

Specifically, suppose the demand in the learning data time period Δi is d(x), x=[t−T−Δi+1, t−T]. Suppose the change in the demand that the trend pattern (Pj) outputs is p(x), x=[t−T−Δi+1, t−T]. In this case, the parameter identification unit 123 determines the value of the parameter of the trend pattern in which $\Sigma(p(x)-d(x))^2$ is the smallest, by an optimization technique (gradient method or the like). The parameters to be determined are, for example, as follows (examples in which the value of the parameter of each trend pattern (Pj) are adjusted so as to be equal to the demand d(t) corresponding to the prediction original final time t). x represents the time.

The parameter of Pj which is a linear function is a in the following equation:

$$p(x)=d(t)-(a*(t-x))$$

The parameter of Pj which is an exponential function includes a and b in the following equation:

$$p(x)=b*a^x+d(t)-(b*a^t)$$

The parameter of Pj which is a soft plus function is a in the following equation:

$$p(x)=a*\log(1+\exp(x))+(d(t)-a*\log(1+\exp(t)))$$

The parameter of Pj which is a soft sine function includes a and b in the following equation:

$$p(x)=a*x/(1+b*|x|)+d(t)-a*t/(1+b*|t|))$$

The parameter of Pj which is a sigmoid function includes a, b, and c in the following equation:

$$p(x)=a/(1+b*\exp(-c*x))+d(t)-a/(1+b*\exp(-c*t))$$

Subsequently, the selection unit 124 evaluates suitability with teacher data for each combination of the trend patterns (Pj)*the learning data time periods (Δi) where the value of the parameter has been identified, and based on the evaluation results, selects the combination where the evaluation of the suitability is highest for the teacher data as the optimal prediction (optimal trend pattern Popt, optimal learning data time period Δopt) (S105). Examples of the method for evaluating suitability include the following three methods, Method 1, Method 2, and Method 2'.

Method 1

With the square sum of the relative error (error/actual demand) of [t−T+1, t] as an evaluation scale, the trend pattern (Pj) and the learning data time period Δi that minimize the square sum are selected as the optimal prediction (optimal trend pattern Popt, optimal learning data time period Δopt).

Figure 7:
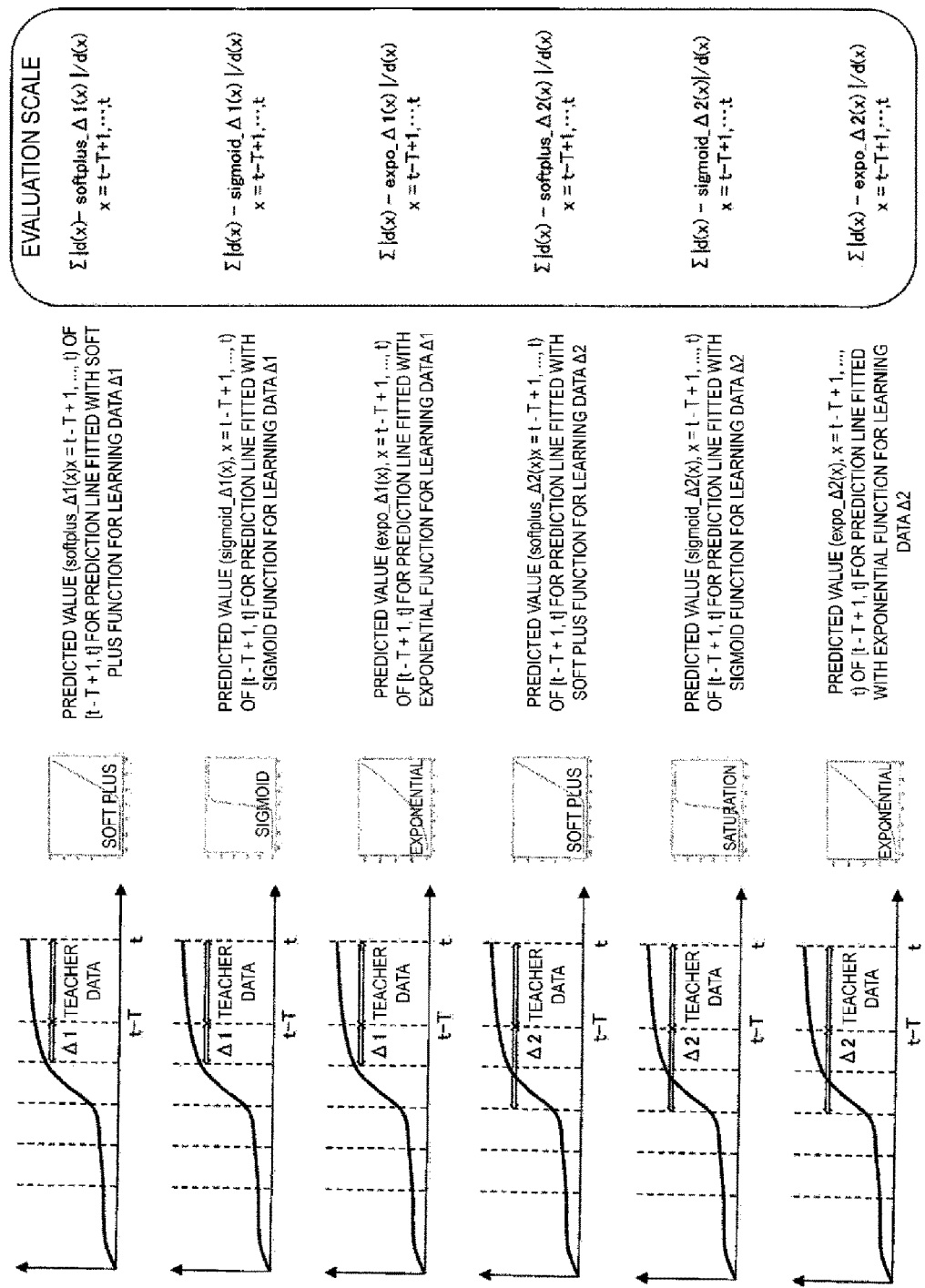
FIG. 7 is a diagram for explaining Method 1 related to evaluation of suitability.

FIG. 7 is a diagram for explaining Method 1 related to evaluation of suitability. In FIG. 7, for convenience, evaluation scales of combinations of a learning data time period Δ1 and three Pj and combinations of a learning data time period Δ2 and three Pj, among all combinations.

Method 2

With τ (τ>0, and, τ−T−Δmax+1>0) (Δmax is the maximum value of Δi) as a parameter, the relationship between time series data of the relative error of [τ−T−Δmax+1, τ−T] and the relative error (error/actual demand) of [τ−T+1, τ] is learned in advance by machine learning (such as deep neural network (DNN)) for each combination of the trend patterns (Pj) and the learning data time periods Δi. Using a learned model, for each combination of the trend patterns (Pj) and the learning data time periods Δi, the evaluation scale (the statistical value (for example, average) of the relative error in [t−T+1, t]) is predicted from the time series data of the relative error of [t−T−Δmax+1, t−T], and the prediction having the best (smallest) predicted value of the evaluation scale is selected as the optimal prediction (optimal trend pattern Popt, optimal learning data time period Δopt).

Figure 8:
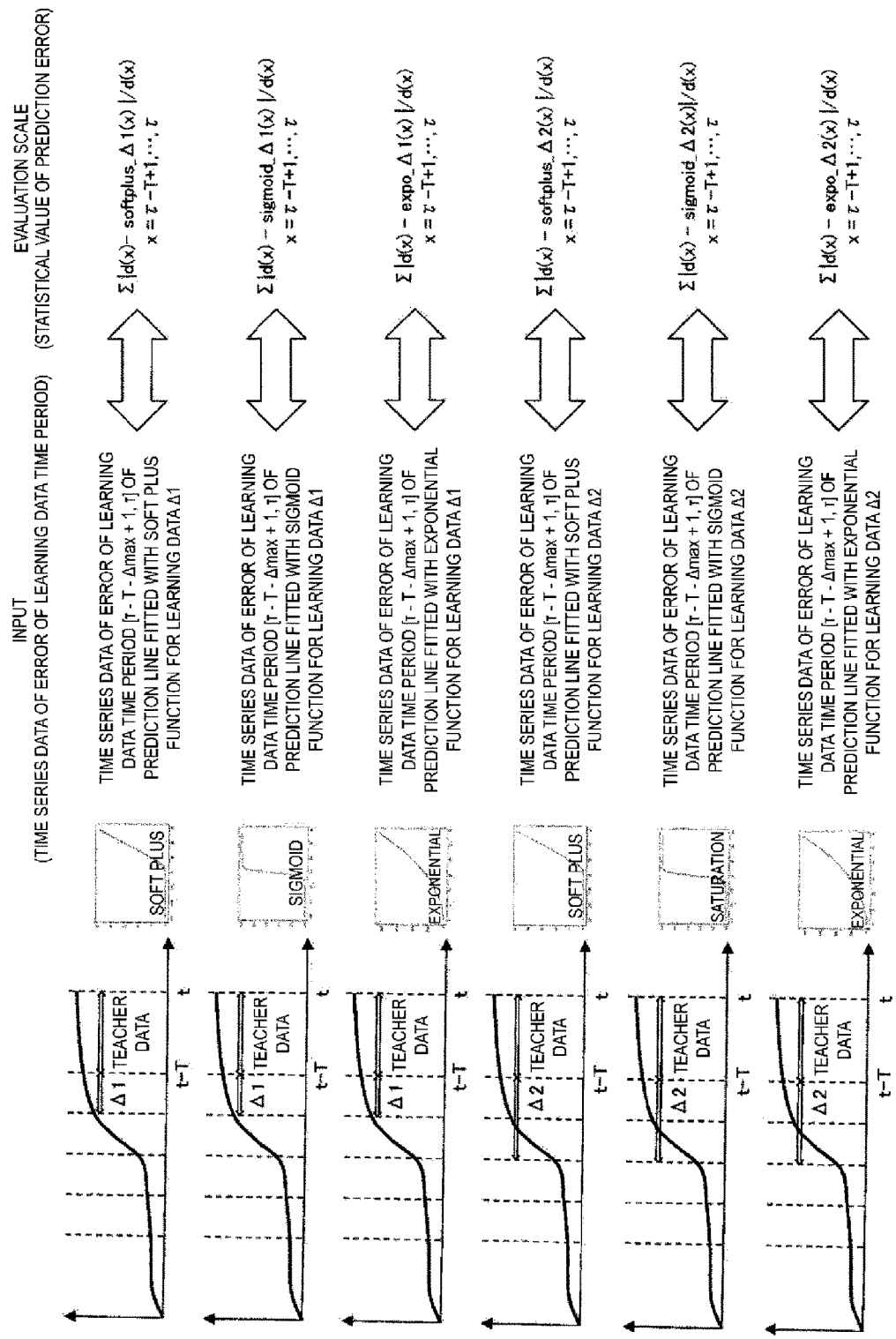
FIG. 8 is a diagram for explaining learning of a relationship between time series data of relative error of $[\tau-T-\Delta max+1, \tau-T]$ and relative error (error/actual demand) of $[\tau-T+1, \tau]$ in Method 2 related to evaluation of suitability.

FIG. 8 is a diagram for explaining learning of a relationship between time series data of relative error of [τ−T−Δmax+1, τ−T] and relative error (error/actual demand) of [τ−T+1, τ] in Method 2 related to evaluation of suitability. In FIG. 8, for convenience, evaluation scales of combinations of a learning data time period Δ1 and three Pj and combinations of a learning data time period Δ2 and three Pj, among all combinations.

Method 2'

Using τ as a parameter, the relationship between the time series pattern of [τ−T−Δmax+1, τ−T] and the relative error (error/actual demand) of [τ−T+1, τ] is learned in advance by machine learning (DNN or the like). Using a learned model, the predicted value of the evaluation scale (the statistical value (for example, average) of the relative error in [t−T+1, t]) of the trend patterns (Pj)*the learning data time periods (Δi) is calculated from the time series pattern of [t−T−Δmax+1, t−T], and the prediction having the best (smallest) predicted value of the evaluation scale is selected as the optimal prediction (optimal trend pattern Popt, optimal learning data time period Δopt).

Figure 9:
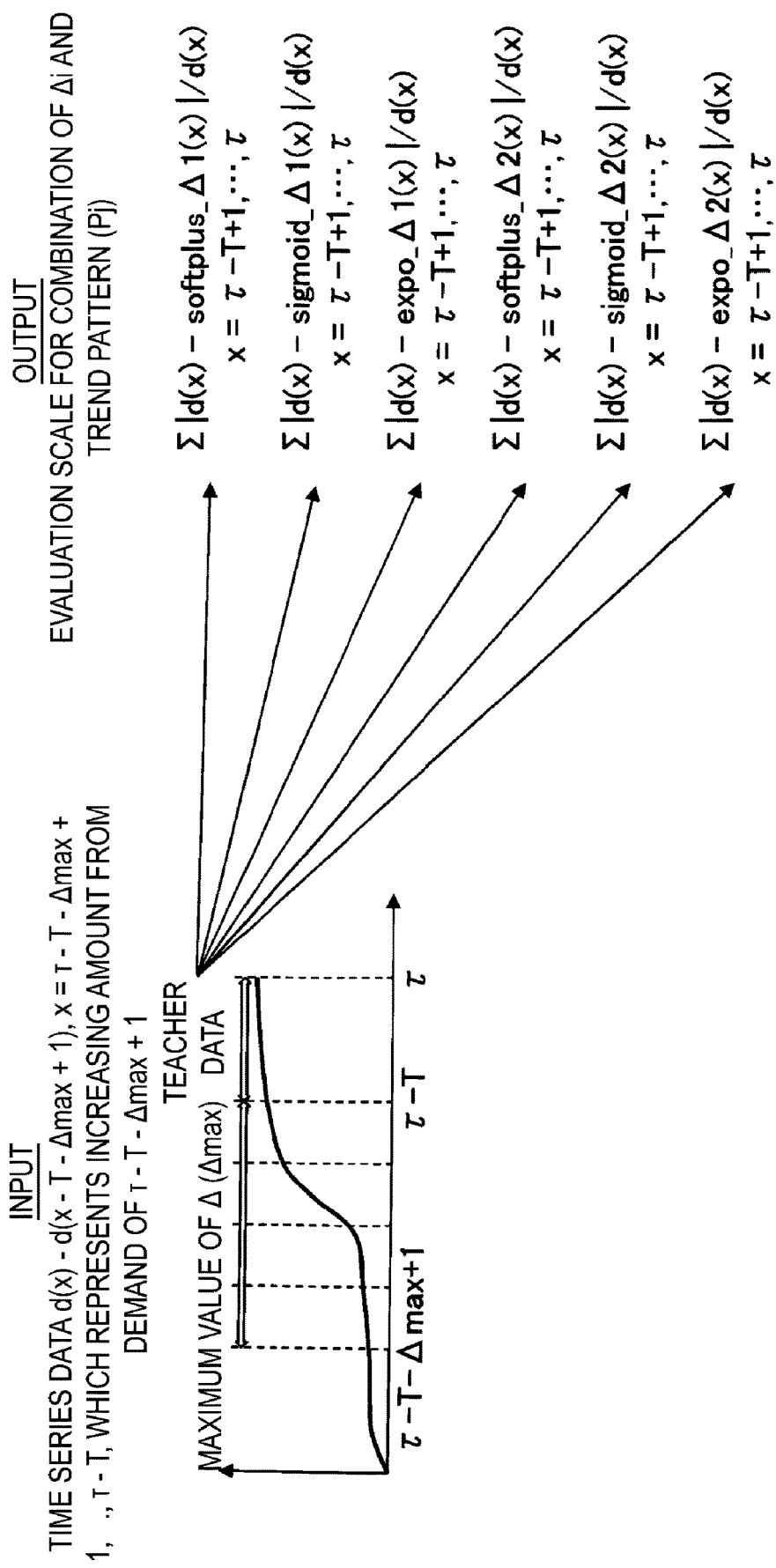
FIG. 9 is a diagram for explaining Method 2' related to evaluation of suitability.

FIG. 9 is a diagram for explaining Method 2' related to evaluation of suitability. In FIG. 9, for convenience, evaluation scales of combinations of three Pj of all combinations are illustrated.

Subsequently, among the trend patterns (Pj) for the optimal learning data time period Δopt (in the present embodiment, 5 Pj), the selection unit 124 selects a Pj which indicates the largest predicted value at a time point t+T as a Pj to be used for upside prediction, and selects a Pj which indicates the smallest predicted value as a Pj to be used for downside prediction (S106). Note that in FIG. 6, five trend patterns Pj for the optimal learning data time period Δopt are illustrated by dashed lines. In this case, among them, a trend pattern (Pj) selected as the optimal prediction in step S105, and the trend patterns (Pj) selected as the upside prediction and the downside prediction in step S106 are illustrated. Note that, depending on the application of the prediction, N-th upside prediction, N-th downside prediction, and the like may be selected. In other words, some trend patterns selected from among the plurality of trend patterns may be varied depending on the application of the prediction.

According to the above, a prediction with a variation in terms of demand can be made possible.

Subsequently, in a case of removing the impact of sudden demand (demand that occurs on account of a network provider, such as migration (for example, migration of a path to a new system), changing an apparatus installation building, and the like), step S107 and subsequent steps may be performed.

At step S107, the sudden demand removal unit 125 calculates the statistical value of the prediction error for the change in the actual demand in [t−T+1, t] in regard to the optimal trend pattern Popt of the optimal prediction selected in step S105, and substitutes the calculation result into the variable X. The method for calculating the statistical value of the prediction error is, for example, as follows.

For the predicted value (Popt_Δopt(x), x=x−T+1, . . . , t) of [t−T+1, t] where the optimal trend pattern Popt is fitted for the optimal learning data time period Δopt, and the actual demand d(x), the calculation is performed as follows:

$$\Sigma |d(x) - Popt\_\Delta opt(x)|/d(x), x = t-T+1, \ldots, t$$

Subsequently, the sudden demand removal unit 125 determines whether X is greater than or equal to the preset tolerance prediction error ε (S108). In other words, it is determined whether the comparison result between the optimal trend pattern Popt of the optimal prediction selected in step S105 and the change in the actual demand satisfies a predetermined condition (a condition where X is less than the tolerance error ε).

In a case where X is less than ε (No in S108), processing of the demand prediction unit 12 is terminated. In this case, the demand prediction unit 12 outputs the optimal prediction, the upside prediction, and the downside prediction that have already been selected as the utilization target of the prediction (S112).

On the other hand, in a case where X is greater than or equal to ε (Yes in S108), the sudden demand removal unit 125 performs a prediction processing of a trend in which the impact of sudden demand has been removed (S109). In the prediction processing, in a case where a change in the trend is not detected (No in S110), the demand prediction unit 12 outputs the optimal prediction, the upside prediction, and downside shake prediction selected in the prediction processing as the utilization target of the prediction (S112).

On the other hand, in the prediction processing of the trend in which the impact of sudden demand has been removed, in a case where a change in the trend is detected (Yes in S110), the trend change handling unit 126 performs a handling processing with a change in the trend (S111), and step S101 and subsequent steps are repeated.

Figure 10:
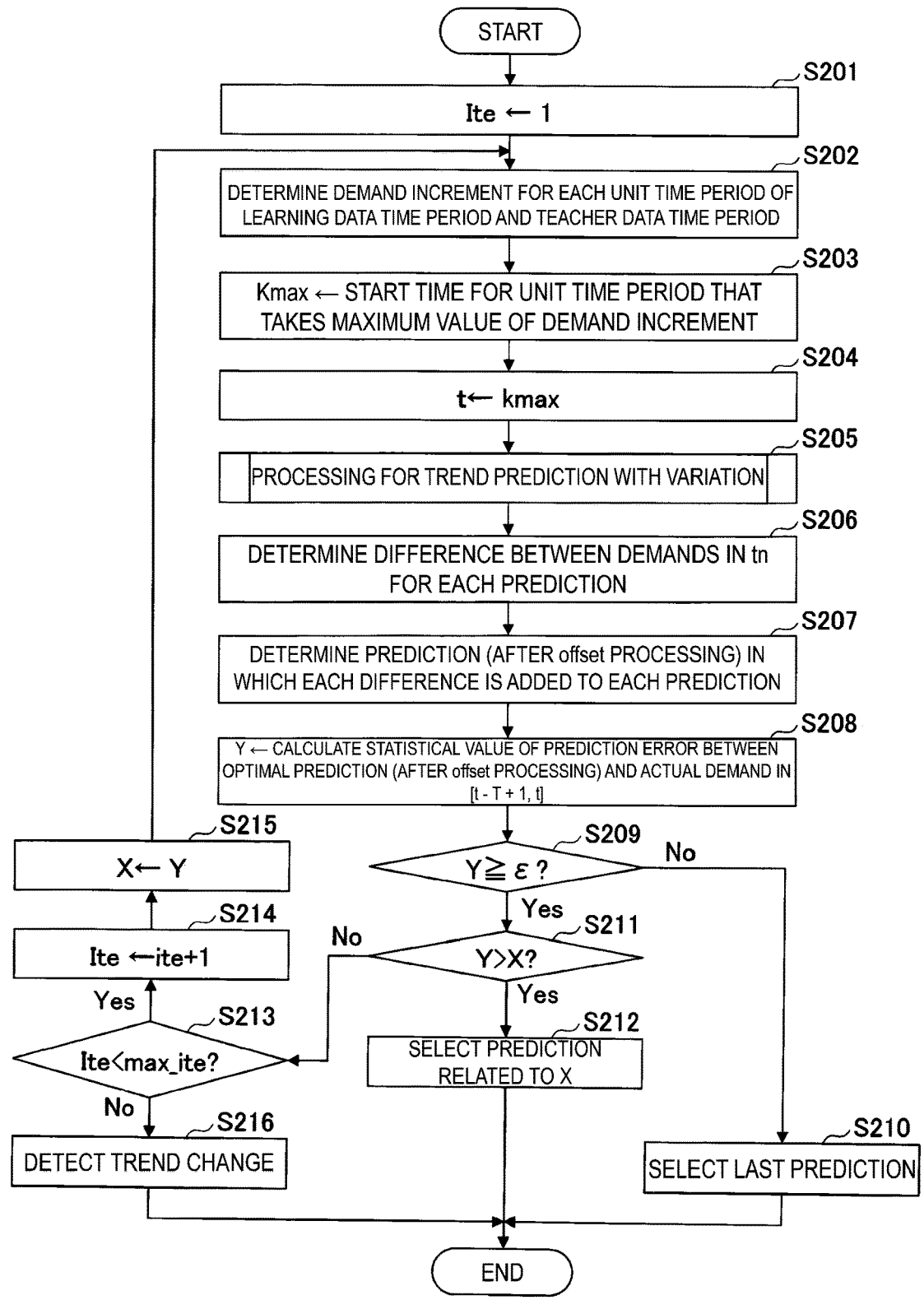
FIG. 10 is a flowchart for explaining an example of a processing procedure of a prediction processing of a trend where an impact of sudden demand has been removed.

Subsequently, details of step S109 will be described. FIG. 10 is a flowchart for explaining an example of a processing procedure of a prediction processing of a trend where an impact of sudden demand has been removed.

In step S201, the sudden demand removal unit 125 substitutes 1 into the variable ite. The variable ite is a variable for storing the number of executions of the processing of step S202 and subsequent steps (number of times the sudden demand is removed).

Subsequently, the sudden demand removal unit 125 determines the demand increment c(x) (x=t−T−Δopt+1, . . . , t−1) for each unit time period (per month) in an optimal learning data time period [t−T−Δopt+1, t−T] and a teacher data time period [t−T+1, t] (S202).

Figure 11:
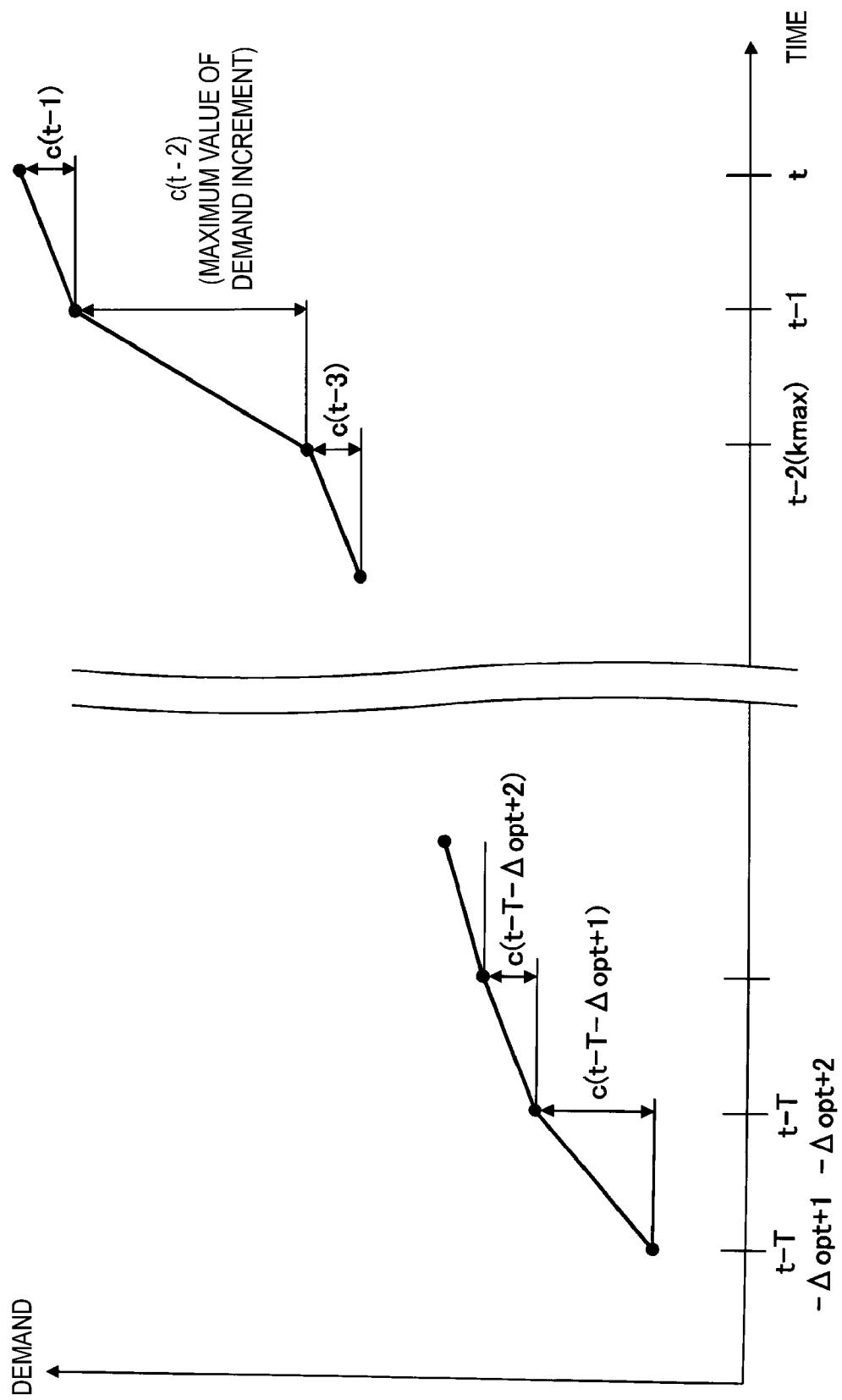
FIG. 11 is a diagram for explaining a demand increment of each unit time period.

FIG. 11 is a diagram for explaining a demand increment of each unit time period. As illustrated in FIG. 11, the difference between the demand at the end time of a time period x and the demand at the start time is defined as a demand increment c(x).

Subsequently, the sudden demand removal unit 125 identifies the start time of the unit time period that takes the maximum value of the demand increment, and substitutes the start time into kmax (S203). In the example of FIG. 11, the demand increment c(t−2) in the unit time period of [t−2, t−1] is the maximum. Thus, t−2, which is the start time of the unit time period, is substituted into kmax.

Subsequently, the sudden demand removal unit 125 updates the prediction original final time t by kmax (S204). As a result, the time period after the start time of the unit time period at which the demand increment is the maximum (i.e., the occurrence time period of sudden demand) is excluded from the prediction original time period.

Subsequently, the sudden demand removal unit 125 performs processing for trend prediction with a variation (S205). The processing for trend prediction with a variation corresponds to a processing procedure (S102 to S106) surrounded by dashed lines in FIG. 5. In this case, the prediction original final time t is shifted in the past direction from tn, the teacher data time period and each learning data time period are also shifted in the past direction by tn−t. Based on the learning data and teacher data corresponding to this shift, the processing for trend prediction with a variation is performed. Note that the respective trend patterns (Pj) of the optimal prediction, the upside prediction, and the downside prediction resulting from the execution of step S205 are referred to hereinafter as an optimal prediction (before offset processing), an upside prediction (before offset processing), and a downside prediction (before offset processing).

Subsequently, the sudden demand removal unit 125 determines the difference between the actual demand and the predicted value at the final demand occurrence time tn (actual demand−predicted value) for each of the optimal prediction (before offset processing), the upside prediction (before offset processing), and the downside prediction (before offset processing) (S206). Note that the final demand occurrence time tn is a value that is unchanged from the initial time. The difference according to the optimal prediction (before offset processing), the difference according to the upside prediction (before offset processing), and the difference according to the downside prediction (before offset processing) are referred to hereinafter as offset (optimal prediction), offset (upside prediction), and offset (downside prediction).

Figure 12:
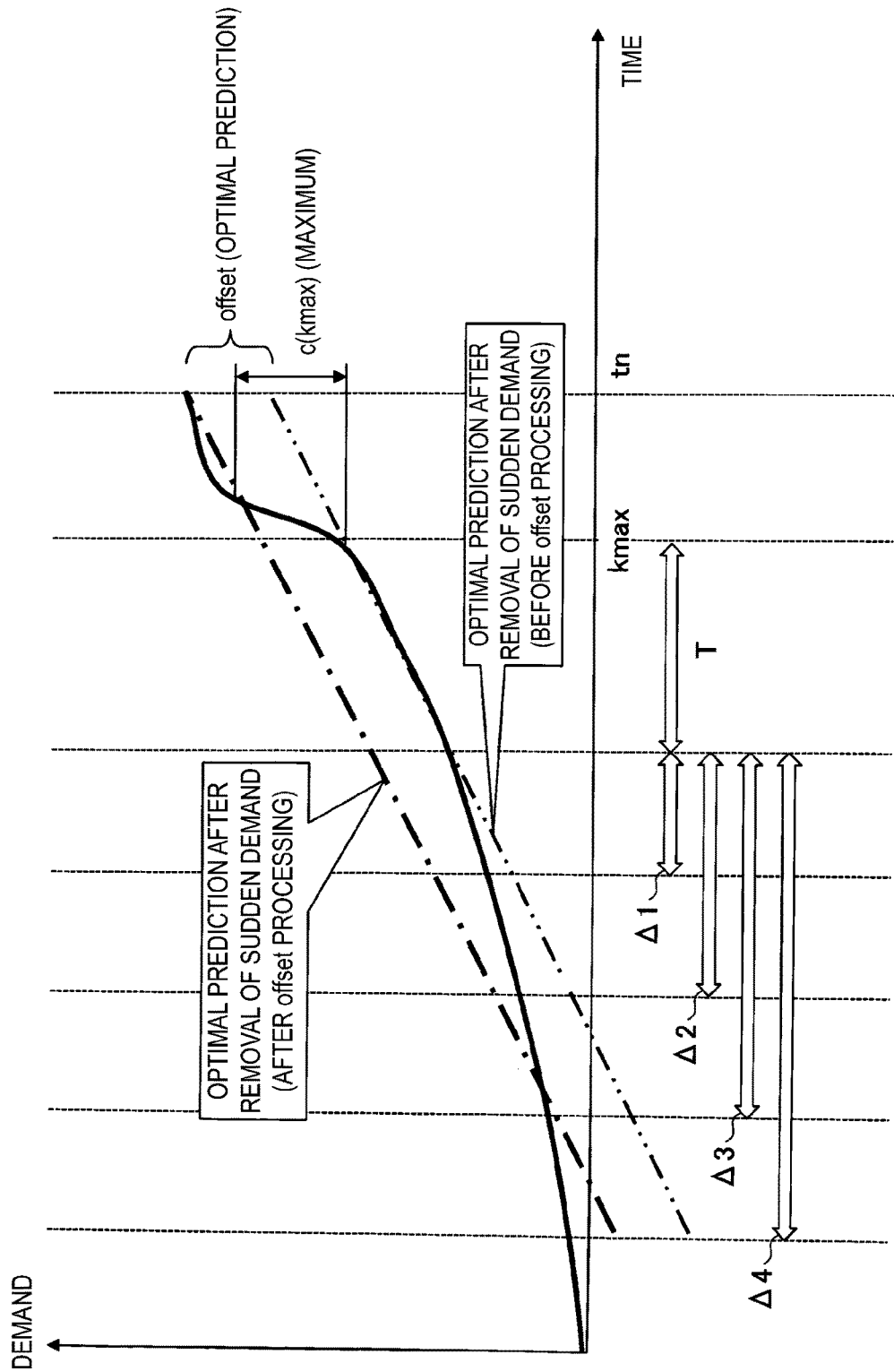
FIG. 12 is a diagram illustrating an example of optimal prediction (after offset processing), upside prediction (after offset processing), and downside prediction (after offset processing).

Subsequently, the sudden demand removal unit 125 determines the results of respectively adding offset (optimal prediction), offset (upside prediction), and offset (downside offset processing) on each of the optimal prediction (before offset processing), the upside prediction (before offset processing), and the downside prediction (before offset processing) as the optimal prediction (after offset processing), the upside prediction (after offset processing), and the downside prediction (after offset processing), respectively (S207). FIG. 12 illustrates an example of optimal prediction (after offset processing), upside prediction (after offset processing), and downside prediction (after offset processing).

Subsequently, for the optimal prediction (after offset processing), the sudden demand removal unit 125 calculates a statistical value (for example, average) of the prediction error for the change in the actual demand in [t−T+1, t] and substitutes the calculation result into the variable Y (S208).

Subsequently, the sudden demand removal unit 125 determines whether Y is equal to or greater than the tolerance prediction error c (S209). In other words, it is determined whether the comparison result between the optimal prediction (after offset processing) and the change in the actual demand satisfies a predetermined condition (a condition where Y is less than the tolerance error ε).

In a case where Y is less than ε (No in S209), the sudden demand removal unit 125 selects, as the utilization target of the prediction, the optimal prediction (after offset processing), the upside prediction (after offset processing), and the downside prediction (after offset processing) that are last obtained (S210).

On the other hand, in a case where Y is equal to or greater than c (Yes in S209), the sudden demand removal unit 125 determines whether Y is greater than X (S211). In other words, t is determined whether the last selected optimal prediction is worse in accuracy than the previously selected optimal prediction. In a case where Y is greater than X (Yes in S211), the sudden demand removal unit 125 selects the optimal prediction utilized in the calculation of X and the upside prediction and the downside prediction corresponding to the optimal prediction as the utilization target of the prediction (S212). The optimal prediction utilized in the calculation of X refers to the optimal prediction determined one time before the last optimal prediction.

On the other hand, in a case where Y is equal to or less than X (No in S211), the sudden demand removal unit 125 determines whether the value of the variable ite is less than max_ite (S213). max_ite indicates the upper limit of the number of times the sudden demand is removed (i.e., the upper limit of the number of repetitions of step S202 and subsequent steps). In a case where the value of the variable ite is less than max_ite (Yes in S213), the sudden demand removal unit 125 substitutes the result of adding 1 to the value of the variable ite into the variable ite (S214). Subsequently, the sudden demand removal unit 125 substitutes the value of the variable Y for the variable X (S215), and repeats step S202 and subsequent steps.

In a case where the value of the variable ite is greater than or equal to the max_ite (that is, in a case where the prediction error is not sufficiently small even if the impact of sudden demand is removed) (No in S213), the sudden demand removal unit 125 detects changes in the trend (S216). In this case, the determination of step S110 in FIG. 5 is No, and step S111 is performed.

Figure 13:
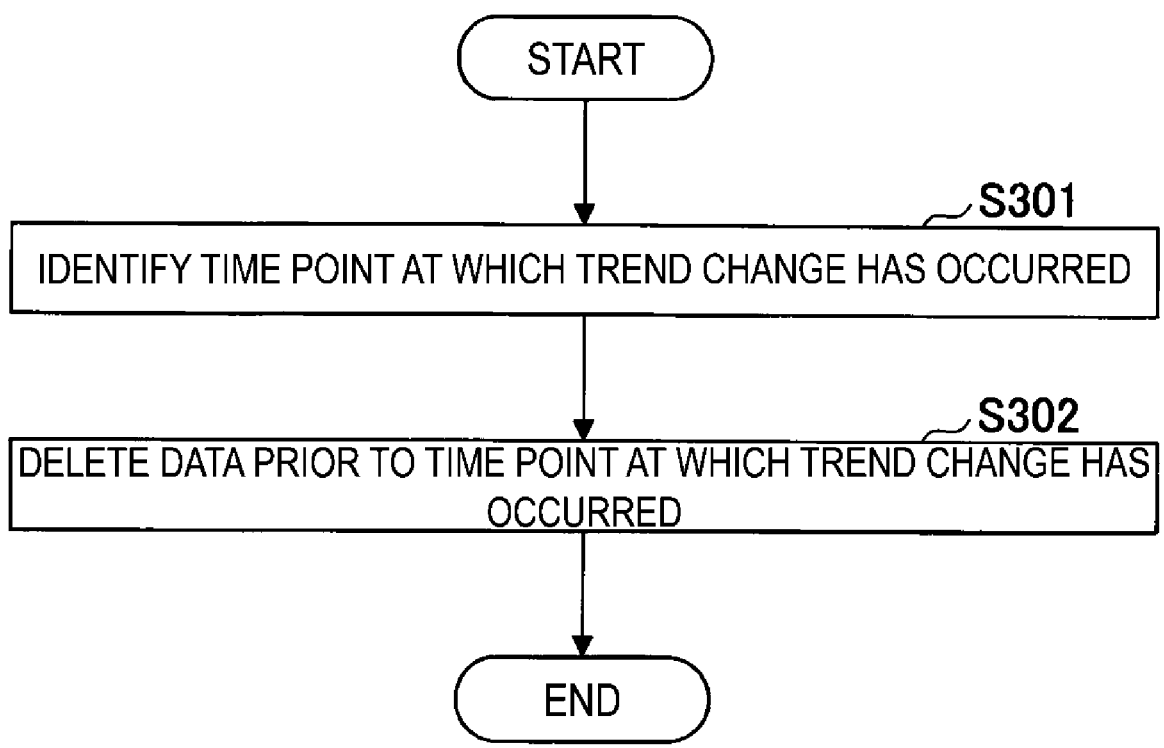
FIG. 13 is a flowchart for explaining an example of a processing procedure of a handling processing with a change in a trend.

Subsequently, details of step S111 will be described. FIG. 13 is a flowchart for explaining an example of a processing procedure of a handling processing with a change in the trend.

In step S301, the trend change handling unit 126 identifies a time point at which a change in the trend has occurred. The following Method 1 and Method 2 are given by way of example as a method for identifying the time at which the change in the trend has occurred.

Method 1

First, the moving average $E[e](x)$ of the prediction error of the optimal prediction at time x, and the moving average $E[\sigma](x)$ of the standard deviation of the prediction error are calculated by the following method. Here, $e(x)$ is the difference between the actual demand and the predicted value of the optimal prediction at time x (actual demand−predicted value).

$$E[e](x) = \alpha * E[e](x-1) + (1-\alpha) * e(x) \qquad (a)$$

$$E[\sigma](x) = \beta * E[\sigma](x-1) + (1-\beta) * |e(x) - E[e](x)| \qquad (b)$$

Calculations of (a) and (b) above are performed for x=tn−T+1, ..., tn. The start time point of the time period at which the condition (exceeding threshold value) where e(x) exceeds an upper limit of error (E[e](x)+γE[σ](x)) occurs N times consecutively is identified as the occurrence time point of the change in the trend. In other words, in a case where exceeding a threshold value is not consecutive for N times, in this embodiment it is determined to be a sudden demand.

Figure 14:
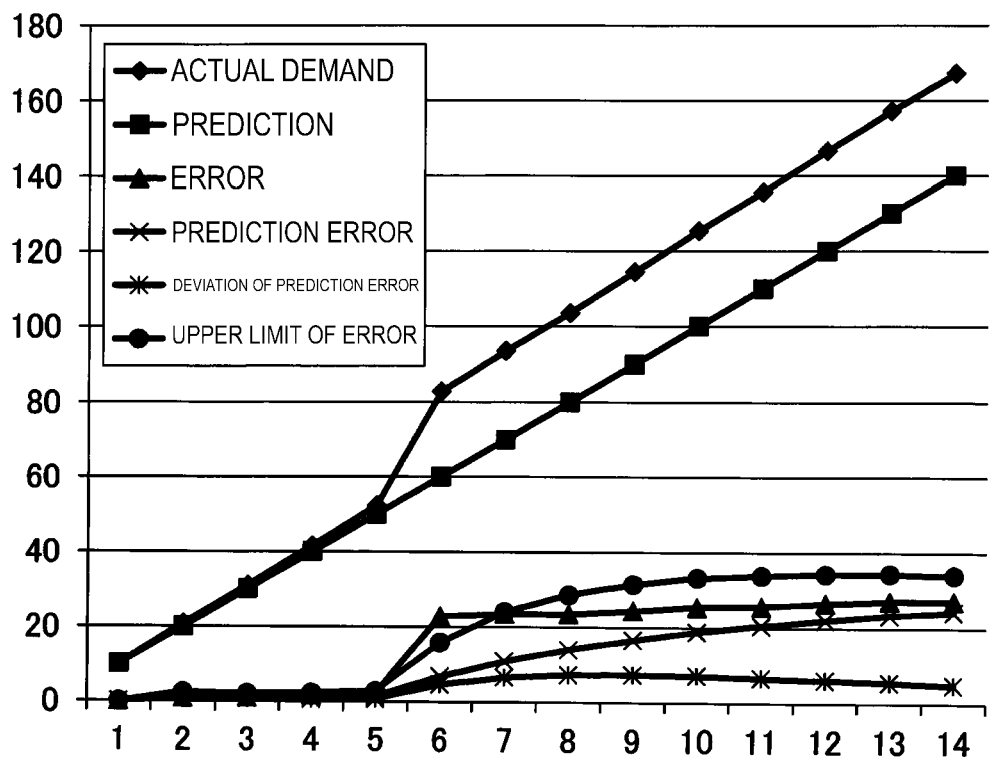
FIG. 14 is a diagram (1) for explaining a first identification method of a time point when a trend is changed.
Figure 15:
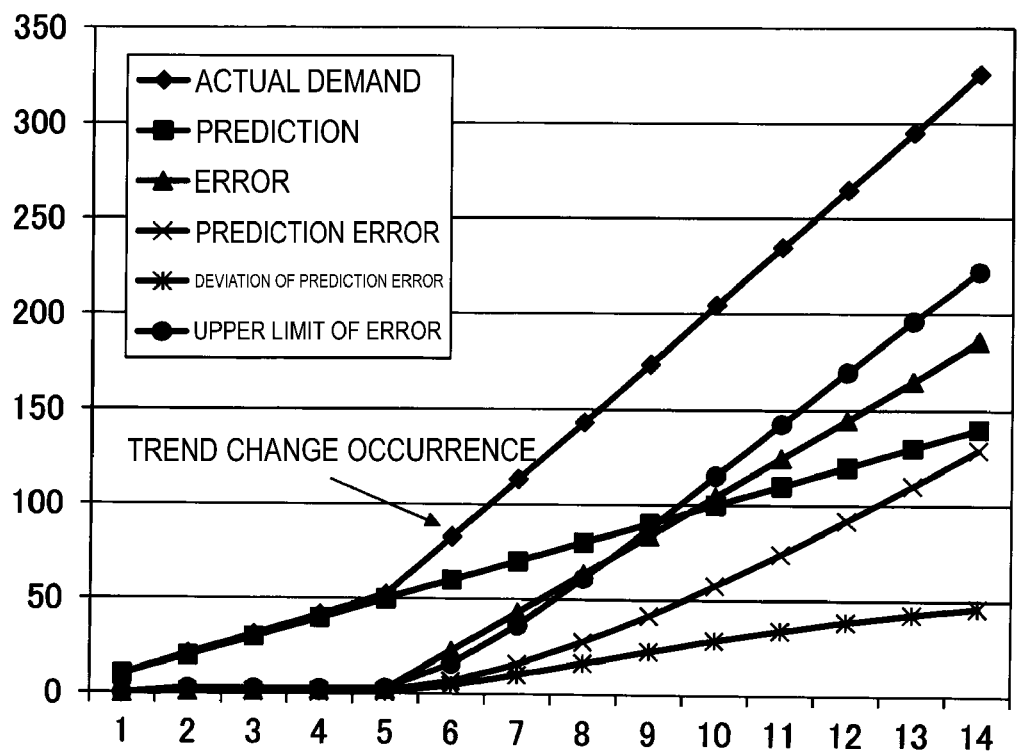
FIG. 15 is a diagram (2) for explaining a first identification method of a time point when a trend is changed.

FIGS. 14 and 15 are diagrams for explaining a first identification method of a time point when a trend change has occurred. In FIGS. 14 and 15, an example is illustrated where α=β=¼, γ=2, and N=3.

The table and graph of FIG. 14 illustrates the time series changes or the like of each parameter for Method 1 in a case where there is no change in trend (a case of sudden demand). The table and graph of FIG. 15 illustrates the time series changes or the like of each parameter for Method 1 in a case where a change in trend has occurred.

In the table of FIG. 14, the condition of exceeding a threshold value (TRUE) in the column of exceeding threshold value is only one time of time=6. Thus, in this case, it is determined that there is no change in the trend.

On the other hand, in the table in FIG. 15, the condition of exceeding a threshold value (TRUE) in the column of exceeding threshold value is consecutive for three times at time=6 to 8. Thus, in this case, the start time point (time=6) of the three consecutive time periods is identified as the time point at which the trend change has occurred.

Method 2

For the data (teacher data) of [tn−T+1, tn], the demand increment c(x) (x=tn−T+1, ..., tn−1) for each unit time period (per month) is determined. The start time kmax for the unit time period that takes the maximum value of the demand increment is identified as a time point at which a trend change has occurred.

Figure 16:
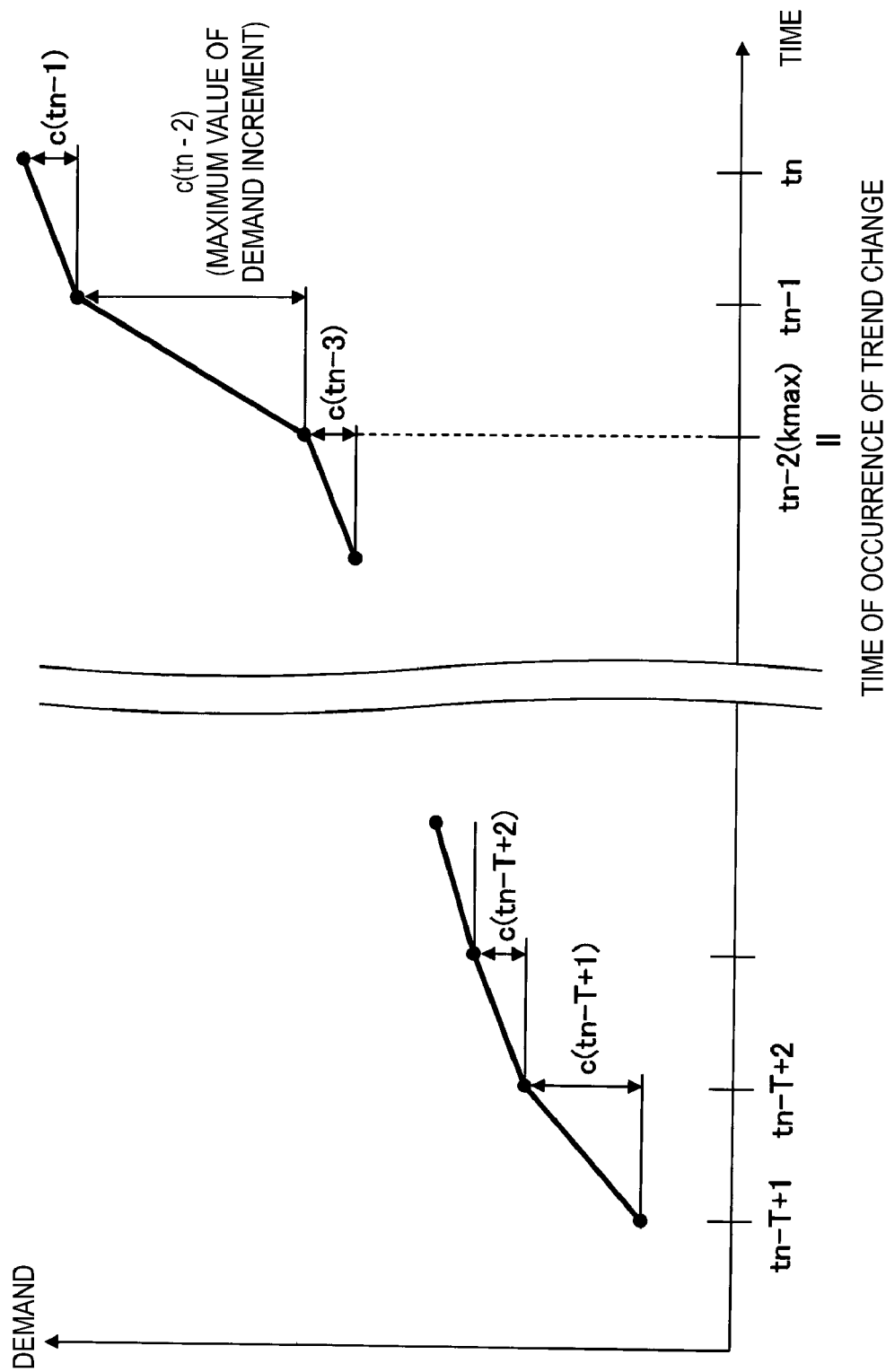
FIG. 16 is a diagram for explaining a second identification method of a time point when a trend is changed.

FIG. 16 is a diagram for explaining a second identification method of a time point when a trend change has occurred. In FIG. 16, an example where tn−2 is identified as the time when a trend change has occurred is illustrated.

Subsequently, the trend change handling unit 126 deletes data of a time period of the time series data of the target prediction unit before the time point when the trend change has occurred (S302).

Note that, as illustrated in FIG. 5, step S302 is followed by the re-execution of step S101 and subsequent steps. In this case, due to the action of step S302, the time period before the time point when the trend change has occurred is removed from the initial prediction original time period (the prediction original time period prior to the removal of the time period of sudden demand). As a result, in a case where the number of data of the time series data of the target prediction unit after the occurrence of the trend change is less than a minimum value of T+Δi, the trend change handling unit 126 is required to perform processing with each Δi as further smaller value (for example, flat 1/n).

As described above, according to the present embodiment, a prediction with a variation in terms of demand can be made possible. As a result, for example, a user may select a prediction line depending on the application and design the investment plan, or network plan, for an infrastructure facility that corresponds to the demand of the path, based on the actual data.

By including a non-linear function in the trend pattern, it is possible to improve the accuracy of demand prediction even in a case where the trend of the future demand increases in a non-linear manner.

Even in a case where sudden demand or trend changes exist, it is possible to improve the accuracy of the demand prediction.

Note that the present embodiment may be applied to demand for other articles or services other than a path.

Note that, in the present embodiment, the prediction original time period is an example of a first time period. The teacher data acquisition unit 121 is an example of a first acquisition unit. The teacher data time period is an example of a second time period. The learning data time period is an example of a third time period. The learning data acquisition unit 122 is an example of a second acquisition unit. The parameter identification unit 123 is an example of a first identification unit. The time period after the start time of the unit time period for which the demand increment is the maximum is an example of a fourth time period. The time period before the time point when the trend change has occurred is an example of a fifth time period. The sudden demand removal unit 125 is an example of a first removal unit. The trend change handling unit 126 is an example of a second removal unit. The optimal trend pattern Popt is an example of a first trend pattern. The optimal prediction (after offset processing) is an example of a second trend pattern.

Although the embodiments of the present invention have been described above in detail, the present invention is not limited to such specific embodiments, and various modifications or changes can be made within the scope of the gist of the present invention described in the claims.

REFERENCE SIGNS LIST

10 Demand prediction apparatus
11 Demand extraction unit
12 Demand prediction unit
13 Demand storage unit
100 Drive device
101 Recording medium
102 Auxiliary storage device
103 Memory device
104 CPU
105 Interface device
121 Teacher data acquisition unit
122 Learning data acquisition unit
123 Parameter identification unit
124 Selection unit
125 Sudden demand removal unit
126 Trend change handling unit
B Bus

The invention claimed is:

1. A demand prediction apparatus comprising a central processing unit (CPU) configured to:

acquire, out of changes in a demand of a path on a network in a first time period, changes in the demand in a second time period being a part of the first time period;

acquire changes in the demand in third time periods for each of the third time periods having different lengths, the third time periods being a plurality of time periods excluding the second time period within the first time period;

identify, for combinations of a plurality of trend patterns and the third time periods, parameters of the plurality of trend patterns such that a value of a trend pattern of the plurality of trend patterns is equal to the demand at a certain time point in the first time period; and evaluate suitability with the changes in the demand in the second time period for each of the plurality of trend patterns for each of the combinations in which a parameter of the parameters is identified and select one or more trend patterns from among the plurality of trend patterns for each of the combinations based on evaluation results, and determine predicted trend patterns, using the one or more selected trend patterns, for a time period beyond the first time period, wherein the predicted trend patterns include a upside prediction, an optimal prediction, and a downside prediction of the demand of the path.

2. The demand prediction apparatus according to claim 1, wherein the CPU is configured to:

compare a first trend pattern of the plurality of trend patterns having highest evaluation result of the evaluation results of the suitability among the plurality of trend patterns for each of the combinations with the changes in the demand, remove, in a case where a comparison result does not satisfy a predetermined condition, a fourth time period from the first time period, the fourth time period being a period after a start of a first unit time period in which increment of the demand is greatest during a unit time period in the third time periods and the second time period according to a combination of the first trend pattern, and determine, after re-executing processing operations with respect to the first time period in which the fourth time period is removed, a difference with the demand at the start of the first unit time period for each of the one or more selected trend patterns to add the difference to each of the one or more trend patterns.

3. The demand prediction apparatus according to claim 2, wherein the CPU is configured to:

compare a second trend pattern with the changes in the demand, the second trend pattern being a pattern in which the difference is added to the first trend pattern, and identify, in a case where a comparison result does not satisfy a predetermined condition, a time point at which a trend of the changes in the demand is changed to remove a fifth time period from the first time period before the fourth time period is removed, the fifth time period being a period before the time point, wherein re-execute processing operations with respect to the first time period in which the fifth time period is removed.

4. A demand prediction method performed by a computer, the demand prediction method comprising:

acquiring, out of changes in a demand of a path on a network in a first time period, changes in the demand in a second time period being a part of the first time period;

acquiring changes in the demand in third time periods for each of the third time periods having different lengths, the third time periods being a plurality of time periods excluding the second time period within the first time period;

identifying, for combinations of a plurality of trend patterns and the third time periods, parameters of the plurality of trend patterns such that a value of a trend pattern of the plurality of trend patterns is equal to the demand at a certain time point in the first time period;

evaluating suitability with the changes in the demand in the second time period for each of the plurality of trend patterns for each of the combinations in which a parameter of the parameters is identified and selecting one or more trend patterns from among the plurality of trend patterns for each of the combinations based on evaluation results; and determining predicted trend patterns, using the one or more selected trend patterns, for a time period beyond the first time period, wherein the predicted trend patterns include a upside prediction, an optimal prediction, and a downside prediction of the demand of the path.

5. The demand prediction method according to claim 4 performed by the computer, comprising comparing a first trend pattern of the plurality of trend patterns having highest evaluation result of the evaluation results of the suitability among the plurality of trend patterns for each of the combinations with the changes in the demand, removing, in a case where a comparison result does not satisfy a predetermined condition, a fourth time period from the first time period, the fourth time period being a period after a start of a first unit time period in which increment of the demand is greatest during a unit time period in the third time periods and the second time period according to a combination of the first trend pattern, and determine, after re-executing acquiring the changes in the demand in the second time period, acquiring the changes in the demand in the third time periods, identifying the parameters, evaluating the suitability, and selecting the one or more trend patterns with respect to the first time period in which the fourth time period has been removed, a difference with the demand at the start of the first unit time period for each of the one or more trend patterns that are selected and add the difference to each of the one or more trend patterns.

6. The demand prediction method according to claim 5 performed by the computer, comprising comparing a second trend pattern with the changes in the demand, the second trend pattern being a pattern in which the difference is added to the first trend pattern, and identifying, in a case where a comparison result does not satisfy a predetermined condition, a time point at which a trend of the changes in the demand is changed to remove a fifth time period from the first time period before the fourth time period is removed, the fifth time period being a period before the time point, wherein acquiring the changes in the demand in the second time period, acquiring the changes in the demand in the third time periods, identifying the parameters, evaluating the suitability, and selecting the one or more trend patterns are re-executed with respect to the first time period in which the fifth time period is removed.

7. A non-transitory computer readable medium storing one or more instructions causing a computer to execute:

acquiring, out of changes in a demand of a path on a network in a first time period, changes in the demand in a second time period being a part of the first time period;

acquiring changes in the demand in third time periods for each of the third time periods having different lengths, the third time periods being a plurality of time periods excluding the second time period within the first time period;

identifying, for combinations of a plurality of trend patterns and the third time periods, parameters of the plurality of trend patterns such that a value of a trend pattern of the plurality of trend patterns is equal to the demand at a certain time point in the first time period;

evaluating suitability with the changes in the demand in the second time period for each of the plurality of trend patterns for each of the combinations in which a parameter of the parameters is identified and selecting one or more trend patterns from among the plurality of trend patterns for each of the combinations based on evaluation results; and determining predicted trend patterns, using the one or more selected trend patterns, for a time period beyond the first time period, wherein the predicted trend patterns include a upside prediction, an optimal prediction, and a downside prediction of the demand of the path.

8. The non-transitory computer readable medium according to claim 7, wherein the one or more instructions further cause the computer to execute:

comparing a first trend pattern of the plurality of trend patterns having highest evaluation result of the evaluation results of the suitability among the plurality of trend patterns for each of the combinations with the changes in the demand, removing, in a case where a comparison result does not satisfy a predetermined condition, a fourth time period from the first time period, the fourth time period being a period after a start of a first unit time period in which increment of the demand is greatest during a unit time period in the third time periods and the second time period according to a combination of the first trend pattern, and determine, after re-executing acquiring the changes in the demand in the second time period, acquiring the changes in the demand in the third time periods, identifying the parameters, evaluating the suitability, and selecting the one or more trend patterns with respect to the first time period in which the fourth time period has been removed, a difference with the demand at the start of the first unit time period for each of the one or more trend patterns that are selected and add the difference to each of the one or more trend patterns.

9. The non-transitory computer readable medium according to claim 8, wherein the one or more instructions further cause the computer to execute:

comparing a second trend pattern with the changes in the demand, the second trend pattern being a pattern in which the difference is added to the first trend pattern, and identifying, in a case where a comparison result does not satisfy a predetermined condition, a time point at which a trend of the changes in the demand is changed to remove a fifth time period from the first time period before the fourth time period is removed, the fifth time period being a period before the time point, wherein acquiring the changes in the demand in the second time period, acquiring the changes in the demand in the third time periods, identifying the parameters, evaluating the suitability, and selecting the one or more trend patterns are re-executed with respect to the first time period in which the fifth time period is removed.

* * * * *